Figure 1:
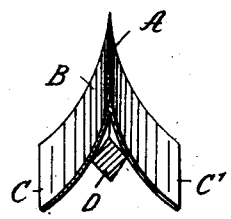

Sept. 13, 1927.  J. RUBARTH  1,642,342

AGRICULTURAL IMPLEMENT

Filed April 20, 1926

Patented Sept. 13, 1927.

1,642,342

UNITED STATES PATENT OFFICE.

JOSEPH RUBARTH, OF WITTLAGE, GERMANY.

AGRICULTURAL IMPLEMENT.

Application filed April 20, 1926, Serial No. 103,384, and in Germany September 23, 1924.

The modern technics for the cultivation of soil require special implements which finely crumble the soil without alteration of the stratification, as in this manner the fertility is best promoted.

The implements of known type (as plows, burrowing plows and grubbers) do not sufficiently fulfill these requirements; they lift the soil by horizontal cutting of the shares so that the crumbling of the soil gets worse the deeper the shares cut. The plow brings further the undersoil up and the grubber burrows up in heavy and wet soil string-shaped earth clods to the top.

An implement gives better results and which cuts the soil in vertical direction pushing the cut off earth in lateral direction by means of a blade which is concave on one side. This cutting blade, if several blades are united to cut very narrow furrows, causes crumbling of the earth at deep plowing and does not bring the undersoil, even of wet soil, to the surface if the blade is of narrow shape. This implement is however adapted better for deep cultivating implements than for plowing at medium height owing to the necessity of arranging the implements in a diagonal row. For plowing at medium height an implement of grubber-like shape is better adapted for larger width of the cut up strip of ground, the crumbling of the soil being carried out as finely as and even better than with the last mentioned implement, this new-type implement ensuring correct working and a good durability of the implement.

These conditions are fulfilled by an implement constructed in accordance with the present invention and consisting of a knife the blade of which is concave towards both sides, similar to a razor-blade, so that the soil cut up by the cutting edge is pushed away to both sides and crumbled.

The essential characteristic feature of the new implement is the concave curvature at the two sides of the blade similar to the concave shape of a shaving-blade.

By this arrangement the new implement, according to the invention, differs also from the sickle-shaped knife mounted as front cutting edge on a body designed to cut drainage trenches. The furrow-cutter of known type separates at the rear into two laterally projecting blades which are however not concave in longitudinal direction, as is the case according to the invention, but in the direction of the width, similar to plow-shares, this shape presenting the inconveniency that heavy, wet soil is brought to the surface.

According to the invention, owing to the hollow curvature of the blades in longitudinal direction, the soil is merely pushed to the side and the turning-up of clods is excluded.

The improved agricultural implement is shown, by way of example, in the accompanying drawing, in which:—

Figure 2:
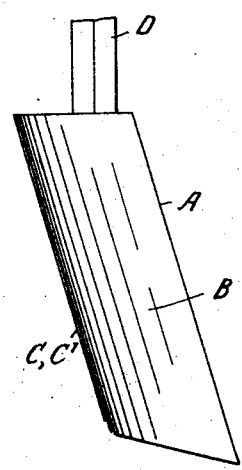
Figure 3:
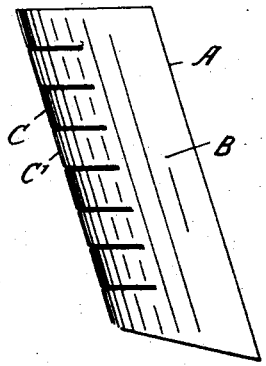

Fig. 1 is a cross section, and
Fig. 2 a side elevation.
Fig. 3 shows in side elevation another form of construction.

The cutting edge A cuts into the ground. The body B of the implement is separated into two parts bent to the right and to the left so that two wings C and C' are formed which are hollow-curved in longitudinal direction. The shaft $d$ serves for fixing the share on the transportable frame.

The hollow curving of the knife blade to two sides may be realized by different constructions for instance the cutting edge A, body B, and blades C, C' might be cast in one piece or pressed or forged in one piece from sheet-steel or they might be composed of several parts. Two pieces of sheet-metal hollow-curved in longitudinal direction but towards different sides might be welded together to form the cutting edge A and the body B, the lateral arms C and $C^1$ being separate the one from the other. The rear arms C, $C^1$ of the knife blade might have teeth bent to different sides. This form of construction is shown in side elevation in Fig. 3.

I claim:—

An agricultural implement for cultivating the soil, comprising in combination a body having a forwardly and substantially vertical cutting edge and two rearwardly and laterally extending wings bent hollow in longitudinal direction so that the cavity is turned towards the cutting edge in order to push to two sides and to crumble the earth which has been cut out by the edge, the rear edges of the wings being indented and the teeth bent alternately in opposite directions.

In testimony whereof I affix my signature.

JOSEPH RUBARTH.